(12) United States Patent
Klank et al.

(10) Patent No.: US 9,637,169 B2
(45) Date of Patent: May 2, 2017

(54) DISPLAY DEVICE AND METHOD FOR DISPLAYING DATA AND DRIVER ASSISTANCE SYSTEM FOR A VEHICLE

(71) Applicant: ZF Friedrichshafen AG, Friedrichshafen (DE)

(72) Inventors: Michael Klank, Osnabrück (DE); Christoph Elbers, Stemwede (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 14/783,125

(22) PCT Filed: Mar. 11, 2014

(86) PCT No.: PCT/EP2014/054638
§ 371 (c)(1),
(2) Date: Oct. 8, 2015

(87) PCT Pub. No.: WO2014/166685
PCT Pub. Date: Oct. 16, 2014

(65) Prior Publication Data
US 2016/0039457 A1    Feb. 11, 2016

(30) Foreign Application Priority Data

Apr. 11, 2013 (DE) .................. 10 2013 206 345

(51) Int. Cl.
*B60K 23/00* (2006.01)
*B62D 15/02* (2006.01)
(Continued)

(52) U.S. Cl.
CPC ............ *B62D 15/025* (2013.01); *B60K 35/00* (2013.01); *B62D 1/046* (2013.01); *B62D 1/10* (2013.01);
(Continued)

(58) Field of Classification Search
USPC ................. 701/36, 41; 345/173; 463/36, 37; 340/431, 691.6
See application file for complete search history.

(56) References Cited

U.S. PATENT DOCUMENTS 5,821,935 A * 10/1998 Hartman ................ B60K 37/06
307/10.1
2002/0135163 A1 * 9/2002 Derrick ................ B60Q 1/1484
280/731
(Continued)

FOREIGN PATENT DOCUMENTS

CN    201 498 098 U    6/2010
KR    2012 0078359 A    7/2012

OTHER PUBLICATIONS

Julie Streitelmeir, GoSmart Clip Sartphone Steering Wheel Mount Review, Jan. 23, 2011, http://the-gadgeteer.com/2011/01/23/gosmart-clip-smartphone-steering-wheel-mount-review/ (last accessed Sep. 26, 2016).*

(Continued)

*Primary Examiner* — Thomas Tarcza
*Assistant Examiner* — Richard Goldman
(74) *Attorney, Agent, or Firm* — Davis & Bujold PLLC; Michael J. Bujold

(57) ABSTRACT

A display device (120) for the display of data. The display device (120) includes a data display device (124) for displaying data. The display device (120) is, or can be, fitted separately onto a steering wheel (102) of a vehicle (100). The display device (120) further includes an acceleration detection device (122) for detecting acceleration relative to at least two axes. The display device (120) is designed to determine, using the detected acceleration, a steering wheel rotational angle of the steering wheel (102) and, using the steering wheel rotational angle, to modify the data display.

8 Claims, 2 Drawing Sheets

(51) Int. Cl.
*B62D 1/04* (2006.01)
*B62D 1/10* (2006.01)
*B60K 35/00* (2006.01)
*G06T 3/60* (2006.01)
*G07C 5/08* (2006.01)

(52) U.S. Cl.
CPC ............ B62D 15/0295 (2013.01); G06T 3/60 (2013.01); G07C 5/0808 (2013.01); G07C 5/0825 (2013.01); *B60K 2350/2004* (2013.01); *B60K 2350/928* (2013.01); *B60K 2350/962* (2013.01)

(56) References Cited

U.S. PATENT DOCUMENTS

| | | | | |
|---|---|---|---|---|
| 2003/0067148 A1* | 4/2003 | Keutz | ............. | B60R 11/04 280/731 |
| 2008/0061954 A1* | 3/2008 | Kulas | ............. | B60K 35/00 340/438 |
| 2008/0287189 A1* | 11/2008 | Rabin | ............. | A63F 13/06 463/36 |
| 2009/0043488 A1* | 2/2009 | Nakayama | ......... | G01C 21/3484 701/532 |
| 2012/0080465 A1 | 4/2012 | Son | | |
| 2012/0142417 A1* | 6/2012 | Haswell | ............. | A63F 13/803 463/37 |
| 2012/0322558 A1* | 12/2012 | Tiley | ............. | A63F 13/02 463/37 |
| 2014/0062891 A1* | 3/2014 | Powell | ............. | B62D 1/046 345/173 |
| 2015/0002285 A1* | 1/2015 | Hatakeyama | ......... | B60K 35/00 340/435 |
| 2015/0042478 A1* | 2/2015 | Kuo | ............. | G08B 21/02 340/576 |
| 2015/0286385 A1* | 10/2015 | Kim | ............. | B62D 1/046 340/461 |
| 2016/0039457 A1* | 2/2016 | Klank | ............. | B62D 1/046 701/41 |

OTHER PUBLICATIONS

International Search Report Corresponding to PCT/EP2014/054638 mailed Jun. 25, 2014.
Written Opinion Corresponding to PCT/EP2014/054638 mailed Jun. 25, 2014.

* cited by examiner

DISPLAY DEVICE AND METHOD FOR DISPLAYING DATA AND DRIVER ASSISTANCE SYSTEM FOR A VEHICLE

This application is a National Stage completion of PCT/EP2014/054638 filed Mar. 11, 2014, which claims priority from German patent application serial no. 10 2013 206 345.8 filed Apr. 11, 2013.

FIELD OF THE INVENTION

The present invention relates to a device for displaying data, to a process for displaying data, to the use of an acceleration detection device for determining a steering wheel rotational angle of the vehicle and modifying a data display, and to a driver assistance system.

BACKGROUND OF THE INVENTION

For driver assistance functions among other things a steering angle of a vehicle is usually determined by means of a factory-fitted steering angle sensor on a steering column. An assistance system, such as a parking and maneuvering aid, is informed of the steering angle by way of the CAN bus. Steering angle data on the CAN bus are not normally standardized and can differ depending on the model year, vehicle manufacturer and vehicle type. For many driver assistance systems a display is also provided.

SUMMARY OF THE INVENTION

Against this background the present invention provides an improved display device for the display of data, an improved process for data display, improved utilization of an acceleration detection device and an improved driver assistance system for a vehicle, in accordance with the advantageous design features that emerge from the description given below.

According to embodiments of the present invention, a display device or display unit with an integrated steering angle sensor can be provided for retrofitting to a steering wheel of a vehicle. Based on the steering wheel rotational angle determined by the sensor, data and pictorial information displayed on the display unit can be adapted to rotational movement of the steering wheel. Moreover the display device can be part of a driver assistance system, which can if necessary provide a driver assistance function related to the steering angle of the vehicle.

Advantageously, in embodiments of the present invention, in particular a universal, vehicle-type-independent retrofit arrangement for a display device and/or a driver assistance system in a vehicle is provided. By determining the steering wheel rotational angle, the display device enables an advantageous display of data adapted to the steering wheel rotational angle. In particular a driver assistance system, which makes use of the display device for implementing driver assistance functions and of the steering angle of the vehicle determined by using the steering wheel rotational angle for the calculation of driver assistance functions, can thus constitute a particularly simple and reliable retrofit system for a vehicle. In this, the steering wheel rotational angle determined by the sensor can serve to modify the display and also to implement driver assistance functions. Thus, for example in different vehicle types, there is no need to provide versions of the display device or the driver assistance system specifically adapted for steering wheel angle sensors already present in the vehicle.

The present invention provides a display device for the display of data, such that the display device comprises a data display unit for the display of data, characterized in that the display device can be retrofitted onto a steering wheel of the vehicle and/or is or can be mounted separately; the display device comprises an acceleration detection device for detecting acceleration relative to at least two axes, and the display device is designed in order to determine, using the acceleration detected, a steering wheel rotational angle of the steering wheel and to modify the data display using the steering wheel rotational angle.

A vehicle is understood to mean a road vehicle, a motor vehicle for carrying passengers and/or goods, such as a passenger car, a truck or some other utility vehicle. The vehicle can be one that is steered by means of a steering wheel. The display device to be retrofitted can be arranged at any point(s) on the steering wheel that will not interfere with the operation of the vehicle, in particular centrally on the steering wheel or in the area of a rotational axis of the steering wheel. The display device can be supplied with energy, for example from a battery. The data display unit can be a monitor screen or other display means. The acceleration detecting device can be an inertial sensor or the like. Inertial sensors serve to measure acceleration and rotational movements as well as inclinations in space. The acceleration detection device can be designed to detect acceleration in relation to two or three axes, the acceleration being produced by rotation of the steering wheel by a driver of the vehicle. In this case, particularly in relation to at least two axes of the acceleration detection device, acceleration relative to gravitational acceleration or acceleration related to gravitational acceleration can be detected. On the basis of the acceleration detected, the steering wheel rotational angle and, if necessary, a steering wheel rotational direction can be determined. If there is a change of acceleration or of the steering wheel rotational angle relative to a basic condition, the data display can be modified. In particular, the data display can be changed or adapted in such manner that independently of a steering wheel rotational angle the display remains orientated in the same way relative to a reference point on the vehicle arranged separately from the steering wheel. For an observer of the data display device the display can then remain so orientated and readable even if the steering wheel, and thus also the data display device, undergo rotation.

In an embodiment, a common housing can be provided in which the data display device and the acceleration detection device can be or are both accommodated. Such an embodiment has the advantage that the data display device and the acceleration detection device can be supplied in common with energy from one energy source. For example, a battery or the like can be used for supplying the data display device and the acceleration detection device with energy. Furthermore data transmission between the data display device and the acceleration detection device can be facilitated, so that data transmission via a radio transmitter or suchlike can be dispensed with. If the data display device and the acceleration detection device are integrated in a single assembly or structural unit and if that unit is fitted for example centrally on the steering wheel, data transmission and energy supply can be simplified. The end customer only needs to attach the display device onto the steering wheel and there is no need for an additional housing for the acceleration detection device.

In particular the display device can be designed so that it can be retrofitted on the steering wheel of the vehicle without having to use tools. Then, the display device can be designed to be retrofitted on the steering wheel by means of a bonded joint. In that case the display device may be fitted on the steering wheel by way of a connection element so that the display device can be taken off the steering wheel for maintenance purposes. Such an embodiment has the advantage that the display device can be fitted particularly simply and inexpensively.

The present invention also provides a process for displaying data, the process having the following steps:

detection of an acceleration relative to at least two axes by means of an acceleration detection device of a display device mounted on a steering wheel of the vehicle separately and/or as a retrofit;

determination of a steering wheel rotational angle of the steering wheel, using the acceleration detected; and modification of a data display, using the steering wheel rotational angle determined.

The process can be carrier out advantageously using a display device as described above or in combination with a display device as described above.

According to an embodiment, in the modification step the data displayed can be shown rotated by the amount of the steering wheel rotational angle with a sign opposite to the steering wheel rotational angle. So that the display remains correctly orientated or rotationally unchanged for an observer, the display, or the lines and symbols shown by the data display device, are kept in an initial position by rotating back to the initial position in accordance with an existing steering wheel rotational angle. During this, part of the data displayed that represents content relevant for a driver can still be rotated. Such an embodiment has the advantage that the display on the data display device remains conveniently readable regardless of the angle through which the steering wheel has been rotated.

In particular, in the modification step the data can be rotated by transformation of displayed image elements by means of a rotation matrix. For this, suitable software can be used for the transformation of individual pixels of the display by means of the rotation matrix. Such an embodiment has the advantage that by such an application of a rotation matrix, the data display modification step is made simpler and less elaborate.

It is also advantageous to use an acceleration detection device in a vehicle, such that the acceleration detection device is designed to detect acceleration relative to at least two axes, for the purpose of determining a steering wheel rotational angle of a steering wheel of a vehicle using the acceleration detected, and in order to modify a display of data by a data display device using the steering wheel rotational angle, wherein the acceleration detection device and the data display device are part of a display device that can be or is fitted or retrofitted separately onto the steering wheel of the vehicle.

The present invention also provides a driver assistance system for a vehicle, the driver assistance system being designed to make available at least one driver assistance function related to a steering angle of the vehicle, the driver assistance system having the following features:

an embodiment of the display device described earlier, which can be or is fitted and/or retrofitted separately onto the steering wheel of the vehicle;

a control unit for evaluating the acceleration and/or the steering wheel rotational angle determined, the control unit being designed such that using the acceleration and/or the steering wheel rotational angle it determines the steering angle of the vehicle and, using the steering angle, it provides at least one driver assistance function by means of the display device.

In combination with the driver assistance system a display device as described above can be used or employed with advantage. For this, the display device and the control unit can be integrated in a common housing, or they can be positioned separately. In particular, the driver assistance system can function as a parking and/or maneuvering aid for the vehicle, if necessary one with a trailer. Such an example application of the driver assistance system can in particular facilitate reversing with a trailer. Thus, problems can be dealt with that arise particularly when different thinking is required, for example when a steering movement to the right results is a movement of the tractor-trailer combination to the left, and when small trailers undergo rapid jackknifing. To simplify maneuvering when steering a vehicle, a bend angle between the vehicle or tractor and a trailer can also be determined along with the actual steering angle, and from this it can be calculated how the vehicle and its trailer will move. By virtue of the driver assistance system as a parking and/or maneuvering aid, such a tractor-trailer movement can be displayed, for example with the help of lines on the data display device, as adjusted to allow for the steering wheel rotational angle.

According to an embodiment, the control unit can be designed to evaluate a variation of the acceleration detected and/or of the steering wheel rotational angle, so as to determine from the steering angle a number of complete revolutions of the steering wheel. Thus, the control unit can be designed to display a history or variation of the acceleration detected. Consequently, starting from a standard steering wheel position that corresponds to driving the vehicle straight ahead, it is also possible to determine a steering angle produced by more than one complete revolution of the steering wheel. Such an embodiment has the advantage that an actual steering angle of the vehicle can be determined more correctly and accurately when the number of revolutions of the steering wheel is taken into account based on the variation of the acceleration caused by a steering wheel rotation movement.

In addition a low-pass filter can be provided in order to suppress high-frequency acceleration fractions (in particular those produced by vibrations) and to let through only low-frequency acceleration fractions (in particular those produced by steering movements). The low-pass filter can be in the form of an independent device, or part of the control unit, and/or a software function. For example, on uneven roads, vertical accelerations due to bumps or vibrations are superimposed on the acceleration due to gravity. Since movement of the steering wheel is slower than such bumps or vibrations, these interferences can be filtered out by low-pass filtering. This enables a clear measurement of the relevant acceleration and from that, of the steering angle.

Furthermore, a sensor device that can be fitted or retrofitted separately from the steering wheel can be provided for detecting a further acceleration relative to at least two axes. In this case the control unit can be designed to determine the steering angle of the vehicle using the acceleration detected and/or the steering wheel rotational angle determined and using also the further acceleration. The sensor device can comprise a further acceleration detection device, which can correspond to the acceleration detection device of the display device. If the further acceleration or a tilting of the vehicle relative to the gravitational acceleration vector is determined by means of a sensor device fitted in the vehicle, a corrected steering angle can be calculated by subtracting the tilt from the measured or detected steering angle. For example, if the vehicle drives from a horizontal road onto a road that slopes to the left or right, the sensor device will prevent such a changed orientation of the vehicle from being wrongly interpreted as rotation of the steering wheel solely because the gravitational acceleration vector is no longer directed perpendicularly to the road. This enables the actual steering angle of the vehicle to be determined more accurately, in that the acceleration detection device of the display device is adjusted or corrected using the further acceleration determined by the sensor device.

BRIEF DESCRIPTION OF THE DRAWINGS

Examples of the invention are explained in greater detail with reference to the attached drawings, which show.

DETAILED DESCRIPTION OF THE PREFERRED EMBODIMENTS

In the following description of preferred example embodiments of the present invention, the same or similar indexes are used for elements shown in the various figures that have similar functions, so that there is no need for repeated descriptions of those elements.

Figure 1:
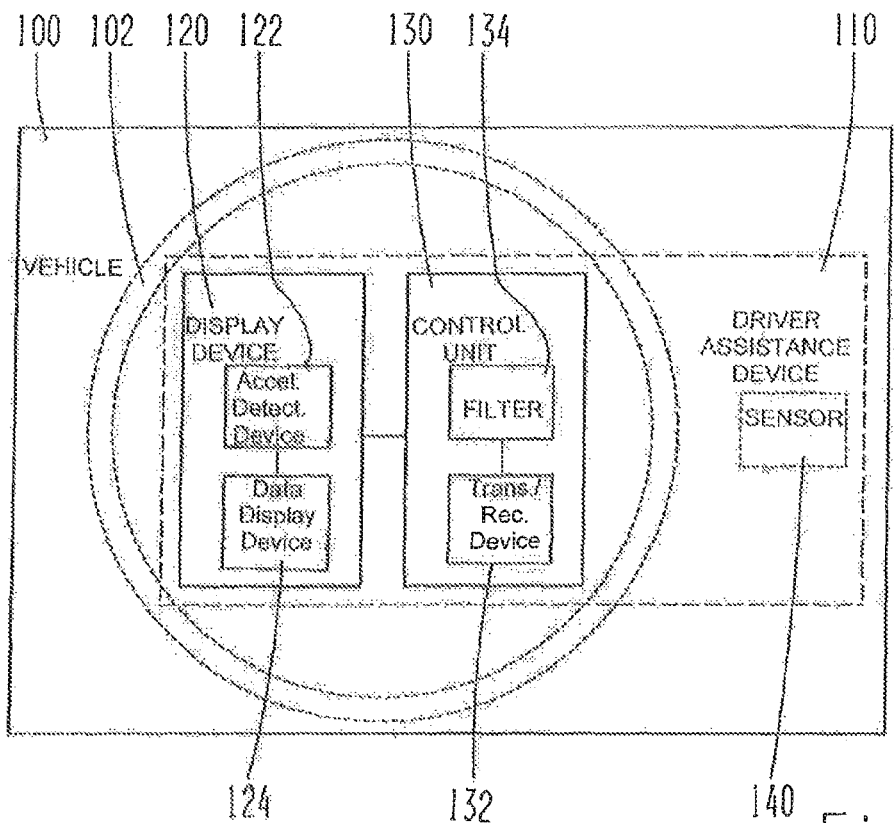
FIG. 1: A schematic representation of a driver assistance system according to an example embodiment of the present invention, and a steering wheel of a vehicle.

FIG. 1 shows a schematic representation of a driver assistance system according to an example embodiment of the present invention, and also a steering wheel of a vehicle. The figure shows a vehicle 100, a steering wheel 102, a driver assistance system 110, a display device 120, an acceleration detection device 122, a data display device 124, a control unit 130, a transmitter-receiver device 132, a low-pass filter 134 and an optional sensor device 140. The driver assistance system 110 comprises the display device 120, the control unit 130 and optionally the sensor device 140. The driver assistance system 110 is designed to provide at least one driver assistance function relating to a steering angle of the vehicle 100, A parking aid and/or a maneuvering aid are examples of such a driver assistance function.

The display device 120 is arranged on the steering wheel 102 of the vehicle 100. In particular, the display device 120 is fitted onto the steering wheel 102 in such manner that there is no need to use special tools for fitting it, even though this is not explicitly evident from FIG. 1. Furthermore, the display device 120 is designed so that it can be retrofitted to the steering wheel 102 of the vehicle. For example the display device 120 can be adhesively bonded to the steering wheel 102 or clipped onto it. The display device 120 can be supplied with energy for example by a battery, or by inductive means. The display device 120 comprises the acceleration detection device 122 and the data display device 124. In this case the display device 120 has a common housing in which the acceleration detection device 122 and the data display device 124 are accommodated.

The acceleration detection device 122 of the display device 120 is designed to determine an acceleration relative to at least two axes, brought about by actuating the steering wheel 102. The acceleration detection device 122 is in particular an inertial sensor. In addition the acceleration detection device 122 is also designed to emit a sensor signal representing the acceleration detected. The data display device 124 of the display device 120 is designed to produce a data display or pictorial display. In other words, the data display device 124 is a monitor screen or display unit.

The display device 120 is designed in order, using the acceleration detected, to determine a steering wheel rotational angle of the steering wheel 102. In addition the display device 120 is designed in order to modify the data shown on the data display device 124 using the steering wheel rotational angle determined. For that purpose the display device 120 is designed in such manner that by means of the data display device 124, the data display is shown rotated by the value of the steering wheel rotational angle with its sign reversed relative to that of the steering wheel rotational angle. The rotated representation of the data display is in this case realized, for example, by transformation of displayed image elements by means of a rotation matrix. According to another embodiment of the present invention the display device 120 is provided as a stand-alone system or in combination with some system other than the driver assistance system 110.

In the example embodiment of the present invention shown and described in FIG. 1, the control unit 130 is arranged on the steering wheel. In this case the control unit 130 is arranged on the steering wheel 102 with the display device 120, for example in the form of a combined assembly. The control unit 130 is connected to the display device 120 by means of a communication interface. The control unit 130 comprises the transmitter-receiver device 132 and the low-pass filter 134. The transmitter-receiver device 132 is designed to receive a sensor signal provided and emitted by the optional sensor device 140 by wireless means, and to transmit the signal to the control unit 130.

The low-pass filter 134 is designed to filter out or suppress high-frequency acceleration fractions produced by vibrations of the vehicle 100 and hence also of the steering wheel 102. Otherwise, such high-frequency acceleration fractions could falsify the acceleration determined. Thus, the low-pass filter 134 is designed to let through low-frequency acceleration fractions that can be attributed to actual steering movements of the steering wheel 102. In doing this the low-pass filter 134 can have a variable filter function with an adjustable threshold.

The control unit 130 of the driver assistance system 110 is designed to evaluate the detected acceleration and the steering wheel rotational angle determined therefrom, in order to determine the steering angle of the vehicle 100 using the detected acceleration and the determined steering wheel rotational angle. In addition the control unit 130 is designed to implement, using the steering angle, the at least one driver assistance function of the driver assistance system 110.

The optionally provided sensor device 140 is arranged on the vehicle 100 separately from the steering wheel 102. The sensor device 140 is designed to detect a further acceleration relative to at least two axes. The sensor device 140 comprises a further acceleration detection device which, for example, corresponds to the acceleration detection device 122 of the display device 120. In this case the further acceleration represents forces to which the vehicle 100 is exposed, in the absence of actuation forces acting directly on the steering wheel 102 due to the actuation of the steering wheel 102. The sensor device 140 is also designed to emit a sensor signal that represents the further acceleration. In this case the control unit 130 is designed, using the acceleration or the steering wheel rotational angle determined and also using the further acceleration, to determine the steering angle of the vehicle 100. Thus, when the steering angle is detected, a position of the vehicle 100 in the Earth's gravitational field can be taken into account or eliminated from consideration.

Figure 2:
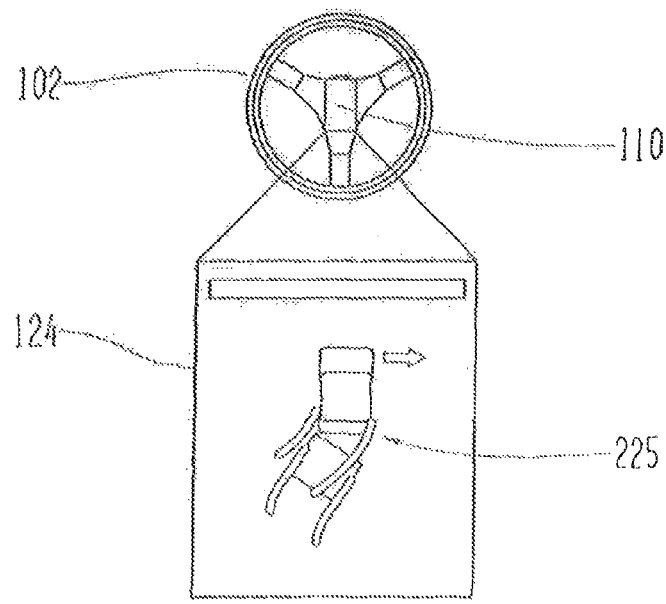
FIG. 2: A schematic representation of a driver assistance system according to an example embodiment of the present invention, fitted on a steering wheel of a vehicle, and a display of the driver assistance system.

FIG. 2 shows a schematic representation of a driver assistance system according to an example embodiment of the present invention, fitted on a steering wheel of a vehicle, and also a display of the driver assistance system. The figure shows a steering wheel 102 which could for example be the steering wheel in FIG. 1, a driver assistance system 110 which could for example be that shown in FIG. 1 a data display device 124, for example that shown in FIG. 1, and a display 225 of data. In the example embodiment of the present invention shown and described in FIG. 2, the driver assistance system 110 is arranged on the steering wheel 102 for example centrally or in the area of a rotation axis thereof.

In FIG. 2 the steering wheel 102 is in an initial rotational position that represents, for example, straight ahead driving of the vehicle in which the steering wheel 102 is installed. This initial rotational position of the steering wheel 102 is again reached if the steering wheel 102 is turned through a complete revolution while the vehicle is rounding a bend. In the initial rotational position of the steering wheel 102, the steering wheel rotational angle is zero.

FIG. 2 shows the data display device 124 of the driver assistance system 110 in an enlarged representation, in order to illustrate the display 225 more clearly. In this case the data display device 124 and the image it displays are shown. By means of the data display device 124, among other things the display 225 of data is provided, this data relating to a driver assistance function of the driver assistance system 110. For example, FIG. 2 shows the display 225 of a driver assistance system 110 or driver assistance function designed as an aid for maneuvering vehicles with a trailer. In this case the display 225 is shown by means of the data display device 124 in a basic orientation corresponding to the initial rotational position of the steering wheel 102.

Figure 3:
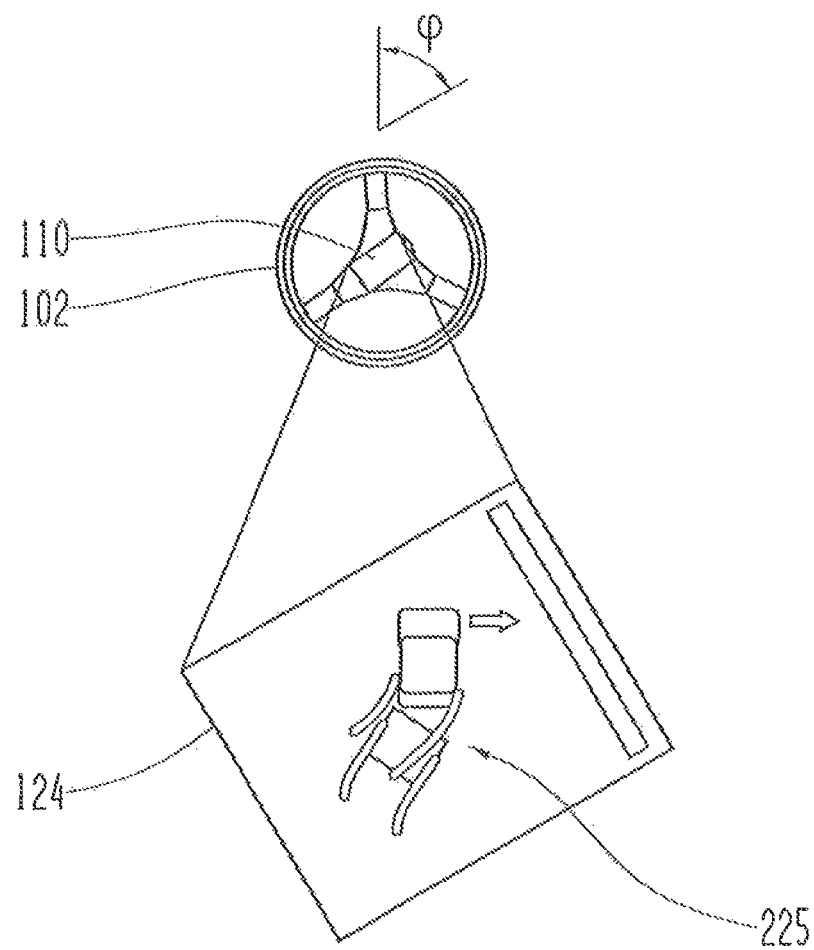
FIG. 3: A schematic representation of a driver assistance system according to an example embodiment of the present invention, fitted on a steering wheel of a vehicle, and a display of the driver assistance system when the steering wheel has been turned.

FIG. 3 shows a schematic representation of a driver assistance system according to an example embodiment of the present invention, on a steering wheel of a vehicle, as well as a display of the driver assistance system when the steering wheel has been rotated. The representation in FIG. 3 here corresponds to the representation in FIG. 2 with the exception that the steering wheel 102 and therefore also the driver assistance system 110 with its data display device 124 have been rotated through a steering wheel rotational angle φ away from the initial rotational position of the steering wheel 102 shown in FIG. 2. By means of the display device of the driver assistance system 110, the display 225 is modified so that by means of the data display device 124, the display 225 is shown in the basic orientation. Thus, the display 225 is rotated relative to the data display device 124 and driver assistance system 110 and relative to the steering wheel 102. In this case the rotational angle of the display 225 corresponds in value to the steering wheel rotational angle φ but with the sign of the rotational angle different from the sign of the steering wheel rotational angle φ. Accordingly, a rotational direction of the steering wheel 102 is cancelled out by a rotational direction of the display 225. For a person looking at the display 225, despite rotation of the steering wheel 102 itself, the display 225 remains substantially rotationally fixed.

Figure 4:
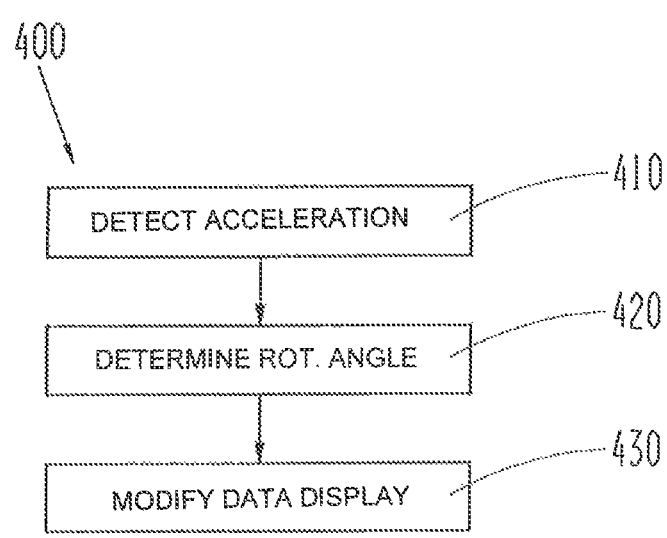
FIG. 4: A sequence diagram of a process according to an example embodiment of the present invention.

FIG. 4 shows a sequence diagram of a process 400 for the display of data for a vehicle, according to an example embodiment of the present invention. The process 400 has a step 410 in which acceleration relative to at least two axes is detected by means of an acceleration detection device of a display device retrofitted to a steering wheel of the vehicle. The process 400 also has a step 420 in which, using the acceleration detected, a steering wheel rotational angle of the steering wheel is determined. In addition the process 400 has a step 430 in which a data display is modified using the steering wheel rotational angle determined.

By implementing the process 400, data for a vehicle can be advantageously displayed by means of a display device such as the sensor device shown and described in relation to FIGS. 1, 2 and 3, or by means of a driver assistance system shown and described in relation to FIGS. 1, 2 and 3. Steps of the process 400 can be carried out by, or using, suitable devices of the display device or driver assistance system. In particular, the step 410 of detecting can be carried out by means of the acceleration detection device in FIG. 1. Furthermore, the step 420 of determining can be carried out by means of the control unit of FIG. 1. Finally, the step 430 of modification can be carried out by means of the data display device and if necessary by means of the control unit of FIG. 1.

The example embodiments described and shown in the figures have been chosen only as examples. Different example embodiments can be combined with one another in their entirety or in relation to individual features. In addition, one example embodiment can be supplemented by features of another example embodiment.

INDEXES

100 Vehicle
102 Steering wheel
110 Driver assistance system
120 Display device
122 Acceleration detection device
124 Data display device
130 Control unit
132 Transmitter-receiver device
134 Low-pass filler
140 Sensor device
225 Display
φ Steering wheel rotational angle
400 Process for displaying
410 Detection step
420 Determination step
430 Modification step

The invention claimed is:

1. A display device (120) for displaying data, the display device (120) comprising:
   a data display device (124) which displays data,
   the display device (120) either is or can be fitted separately onto a steering wheel (102) of a vehicle (100),
   the display device (120) further comprising an acceleration detection device (122) for detecting acceleration in at least two axes relative to a gravitational acceleration vector,
   a low-pass filter (132) suppresses high-frequency acceleration vibrations of the detected acceleration while letting through low-frequency acceleration vibrations of the detected acceleration,
   the display device (120) determining a steering wheel rotational angle (φ) of the steering wheel (102), using the detected acceleration, and the display device orienting a display (225) of the data relative to the steering wheel, based on the steering wheel rotational angle (φ).

2. The display device (120) according to claim 1, wherein the data display device (124) and the acceleration detection device (122) are arranged in a common housing.

3. The display device (120) according to claim 1, wherein the display device (120) is securable to a preexisting steering wheel (102) of the vehicle (100) without use of hand tools.

4. A process (400) for displaying data comprising:
- detecting (410) acceleration in at least two axes relative to gravitational acceleration, via an acceleration detection device (122) of a display device (120) that is secured onto a steering wheel (102) of a vehicle (100):
- filtering the detected acceleration with a low-pass filter to suppress high-frequency acceleration vibrations while allowing low-frequency acceleration vibrations to pass;
- determining (420), from the detected acceleration, a steering wheel rotational angle (φ) of the steering wheel (102); and
- orienting a display(225) of the data relative to an initial position of the display of the data based on the determined steering wheel angle (φ).

5. The process (400) according to claim 4, further comprising showing the oriented display of the data with the display device, the oriented display of the data being rotated from the initial position of the display of the data by a value of the steering wheel rotational angle (φ) having a sign opposite to that of the steering wheel rotational angle (φ).

6. The process according to claim 4, further comprising rotating the display of the data relative to the initial position of the display of data by transforming displayed image elements of the display of the data, the displayed image elements of the display of the data being transformed from the initial position to another position according to application software which applies a rotation matrix to the displayed image elements.

7. A driver assistance system (110) for a vehicle (100), the driver assistance system (110) providing at least one driver assistance function related to a steering angle of the vehicle (100), the driver assistance system (110) comprising:
- a display device (120) for the displaying data,
- the display device having a data display device (124) which displays the data,
- the display device (120) is either secured on a steering wheel (102) of a vehicle (100) or secured in the vehicle independent of the steering wheel,
- the display device (120 further comprising an acceleration detection device (122) for detecting acceleration in at least two axes relative to gravitational acceleration,
- the display device (120) determining a steering wheel rotational angle (φ) of the steering wheel (102), based on the detected acceleration, and modifies orientation of a display (225) of the data based on the steering wheel rotational angle (φ),
- a control unit (130) for evaluating at least one of the detected acceleration and the determined steering wheel rotational angle (φ), the control unit (130) determining the steering angle of the vehicle (100) based on the at least one of the detected acceleration and the determined steering wheel rotational angle (φ), and the control unit implementing, via the display device (120), the at least one driver assistance function based on the steering angle, and
- the control unit (130) evaluates a variation of the at least one of the detected acceleration and the determined steering wheel rotational angle (φ), in order to determine a number of revolutions of the steering wheel (102), which is considered for the determination of the steering angle.

8. A driver assistance system (110) for a vehicle (100), the driver assistance system (110) providing at least one driver assistance function related to a steering angle of the vehicle (100), the driver assistance system (110) comprising:
- a display device (120) for a displaying data,
- the display device having a data display device (124) which displays the data,
- the display device (120) is either secured on a steering wheel (102) of a vehicle (100) or secured in the vehicle independent of the steering wheel,
- the display device (120) further comprising an acceleration detection device (122) for detecting acceleration in at least two axes relative to gravitational acceleration,
- the display device (120) determining a steering wheel rotational angle (φ) of the steering wheel (102), based on the detected acceleration, and modifies orientation of a display (225) of the data based on the steering wheel rotational angle (φ),
- a control unit (130) for evaluating at least on of the detected acceleration and the determined steering wheel rotational angle (φ), the control unit (130) determining the steering angle of the vehicle (100) based on the at least one of the detected acceleration and the determined steering wheel rotational angle (φ), and the control unit implementing, via the display device (120), the at least one driver assistance function based on the steering angle, and
- a low-pass filter (132) suppresses high-frequency acceleration vibrations while letting through low-frequency acceleration vibrations.

* * * * *